(12) United States Patent
Yoshino (10) Patent No.: US 7,710,638 B2
(45) Date of Patent: May 4, 2010

(54) WAVELENGTH CONVERSION DEVICES

(75) Inventor: Takashi Yoshino, Ama-gun (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/034,820

(22) Filed: Feb. 21, 2008

(65) Prior Publication Data
US 2009/0009854 A1 Jan. 8, 2009

(30) Foreign Application Priority Data
Feb. 23, 2007 (JP) ............................. 2007-043466

(51) Int. Cl.
*G02F 2/02* (2006.01)
*G02F 1/35* (2006.01)
*G02B 6/10* (2006.01)

(52) U.S. Cl. .................... 359/332; 359/326; 385/131

(58) Field of Classification Search ......... 359/326–332; 385/122, 129–132
See application file for complete search history.

(56) References Cited

U.S. PATENT DOCUMENTS

| | | | | |
|---|---|---|---|---|
| 6,631,231 B2* | 10/2003 | Mizuuchi et al. | ............ | 385/122 |
| 6,999,668 B2* | 2/2006 | Yokoyama et al. | .......... | 385/129 |
| 7,394,588 B2* | 7/2008 | Wu et al. | ..................... | 359/326 |
| 2003/0044100 A1 | 3/2003 | Kondo et al. | | |
| 2003/0138180 A1 | 7/2003 | Kondo et al. | | |
| 2004/0264832 A1 | 12/2004 | Kondo et al. | | |
| 2006/0109542 A1* | 5/2006 | Mizuuchi et al. | ............ | 359/330 |
| 2008/0218847 A1* | 9/2008 | Yoshino | ...................... | 359/326 |

FOREIGN PATENT DOCUMENTS

| JP | 2003-156723 | 5/2003 |
|---|---|---|
| WO | 03/042749 | 5/2003 |

OTHER PUBLICATIONS

U.S. Appl. No. 12/038,208, filed Feb. 27, 2008, Yoshino, Takashi.

* cited by examiner

*Primary Examiner*—Daniel Petkovsek
(74) *Attorney, Agent, or Firm*—Burr & Brown (57) ABSTRACT

A wavelength conversion device has a supporting substrate, and a wavelength conversion element provided on the supporting substrate, with separate portions provided on both sides of the wavelength conversion element. The separate portions are separated from the wavelength conversion element by an adhesive layer that bonds the supporting substrate and the wavelength conversion element while also bonding the supporting substrate with the separate portions. The element and separate portions are made of ferroelectric materials, respectively. The wavelength conversion element has a ridge optical waveguide, with grooves provided on each or both sides of the ridge optical waveguide and extended portions provided on the outside of each of the grooves.

4 Claims, 7 Drawing Sheets

WAVELENGTH CONVERSION DEVICES

This application claims the benefit of Japanese Patent Application P 2007-43466 filed on Feb. 23, 2007, the entirety of which is incorporated by reference.

BACKGROUND ART

1. Technical Field of the Invention

The present invention relates to a wavelength conversion device.

2. Related Art

Non-linear optical crystals such as a lithium niobate single crystal and a lithium tantalate single crystal have a high secondary non-linear optical constant; and forming a periodic polarization inversion configuration in these crystals produces a Quasi-Phase-Matched (QPM) Secondary-Harmonic-Generation (SHG) device. And forming a waveguide in this periodic polarization inversion configuration will produce a high efficient SHG device, which leads to a wide variety of applications for optical communication, medical, photochemical, and various optical measurement fields.

The light modulation device disclosed in the WO 03/042749 has a configuration such that the surface of a supporting substrate is made flat, the thickness of a ferroelectric thin plate is made constant, and the flat surface of the supporting substrate is bonded to the ferroelectric thin plate.

Japanese Patent Publication No. 2003-156723A provides a ridge optical waveguide on a ferroelectric single crystal thin plate, and forms a periodic polarization inversion configuration in the ridge optical waveguide to make a Secondary-Harmonic-Generation device. And a supporting substrate is bonded below the ferroelectric single crystal thin plate, and a recession is made on the supporting substrate in a manner that the recession is located right below the ridge optical waveguide. The supporting substrate and the back of the ferroelectric thin plate are bonded by a resin adhesive or a conductive adhesive.

SUMMARY OF THE INVENTION

A wavelength conversion device is required to oscillate a stabilized converted light under various conditions of the ambient temperature. However, some conventional wavelength conversion devices have a significant intensity decrease of the wavelength converted light, when the ambient temperature greatly changes. If there occurs a significant intensity decrease in the temperature range of $-20°$ C. to $+80°$ C., for example, the practical performance as a wavelength conversion element will deteriorate.

An object of the present invention is to provide a configuration wherein a light intensity of a wavelength converted light is stabilized under a wide range of ambient temperature.

The wavelength conversion device of the present invention preferably includes:

a supporting substrate;

a wavelength conversion element located on said supporting substrate and comprising a ferroelectric material, said wavelength conversion element comprising a ridge optical waveguide, grooves provided on both sides of said ridge optical waveguide, respectively, and extended portions provided on the outside of said grooves, respectively;

separate portions provided on both sides of said wavelength conversion element, respectively, and comprising a ferroelectric material, said separate elements are separated from said wavelength conversion element; and an adhesive layer bonding said supporting substrate and said wavelength conversion element and bonding said supporting substrate and said separate portions.

The inventors have examined the cause for which the intensity of the wavelength converted light is greatly affected and lowered by the ambient temperature change in a wavelength conversion device provided with the wavelength conversion element inside the ridge optical waveguide. As the result, the inventors conceived that a stress acts on the wavelength conversion element from the adhesive layer provided between the wavelength conversion element and the supporting substrate responsive to the variations of the ambient temperatures, whereby the phase-matched wavelength in the wavelength conversion element is slightly varied. If the phase-matched wavelength is slightly varied, it will remarkably lower the output power of the converted light. The inventors assumed that the stress acting on the wavelength conversion element from the adhesive layer is mainly originated starting from an end face exposed from the outer side of the adhesive layer and then acts on the wavelength conversion element. Because the end face of the adhesive layer is exposed, the stress is likely to concentrate thereto, which likely generates partial detachments.

Based on this unknown hypothesis, the inventors made both sides of the wavelength conversion element separate from the wavelength conversion element to provide two separate side bodies. As the result, the inventors found that the intensity drop of the wavelength converted light is remarkably suppressed even if the ambient temperature greatly varies.

Although it is difficult to give a clear explanation to this result, the inventors conceive that if a stress is generated by the variations of the ambient temperature to the adhesive layer from the sides of the wavelength conversion element, the stress is absorbed in the gaps or grooves between the separate portions and the wavelength conversion element. Thereby, it is conceivable that the stress generated on the end face of the adhesive layer is shielded to avoid a direct influence on the wavelength conversion element.

BEST MODES FOR CARRYING OUT THE INVENTION

The present invention will be described in detail with reference to the appended drawings.

Figure 1:
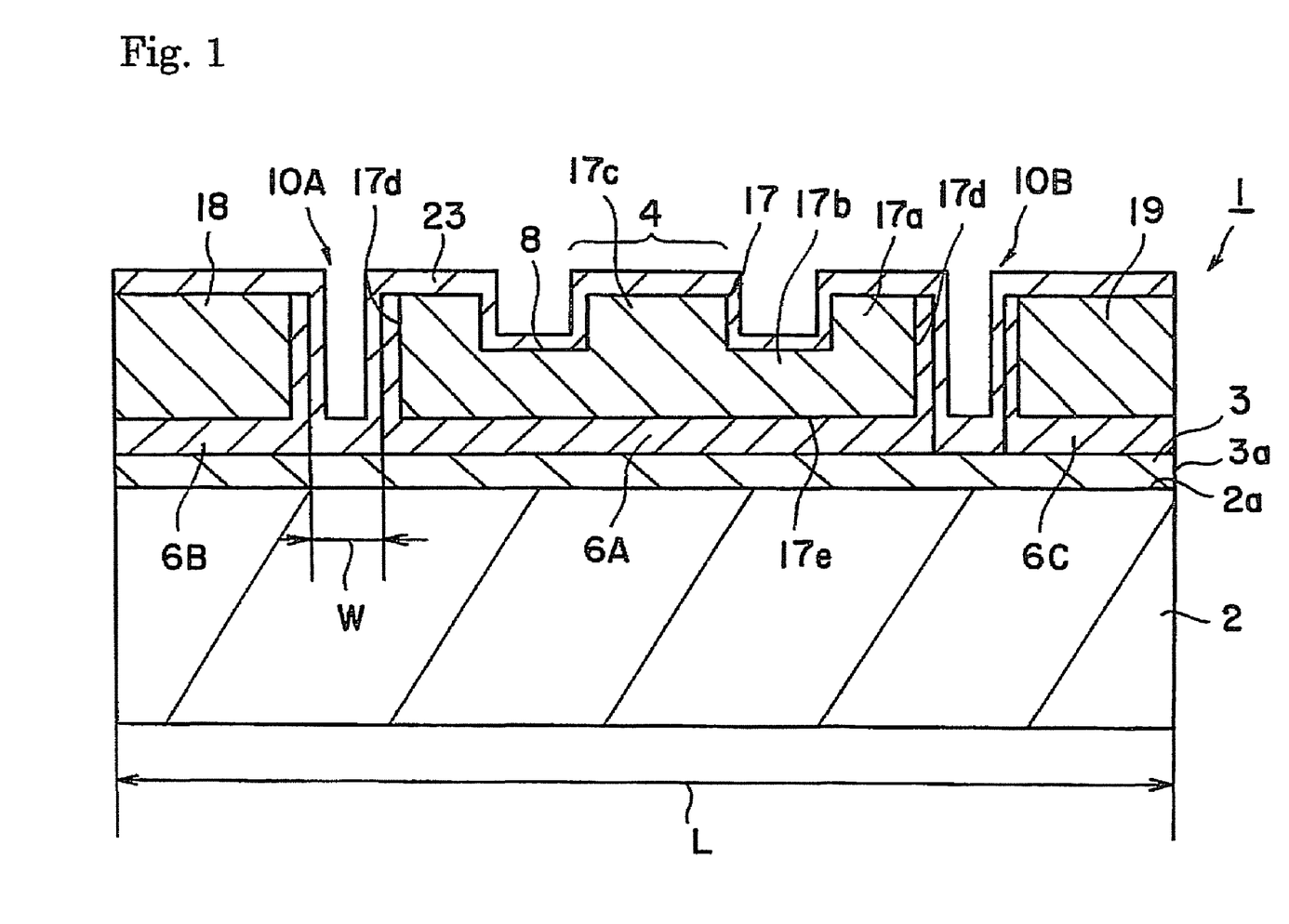
FIG. 1 is a sectional view schematically illustrating a wavelength conversion device 1 relating to the embodiment of the present invention.
Figure 2:
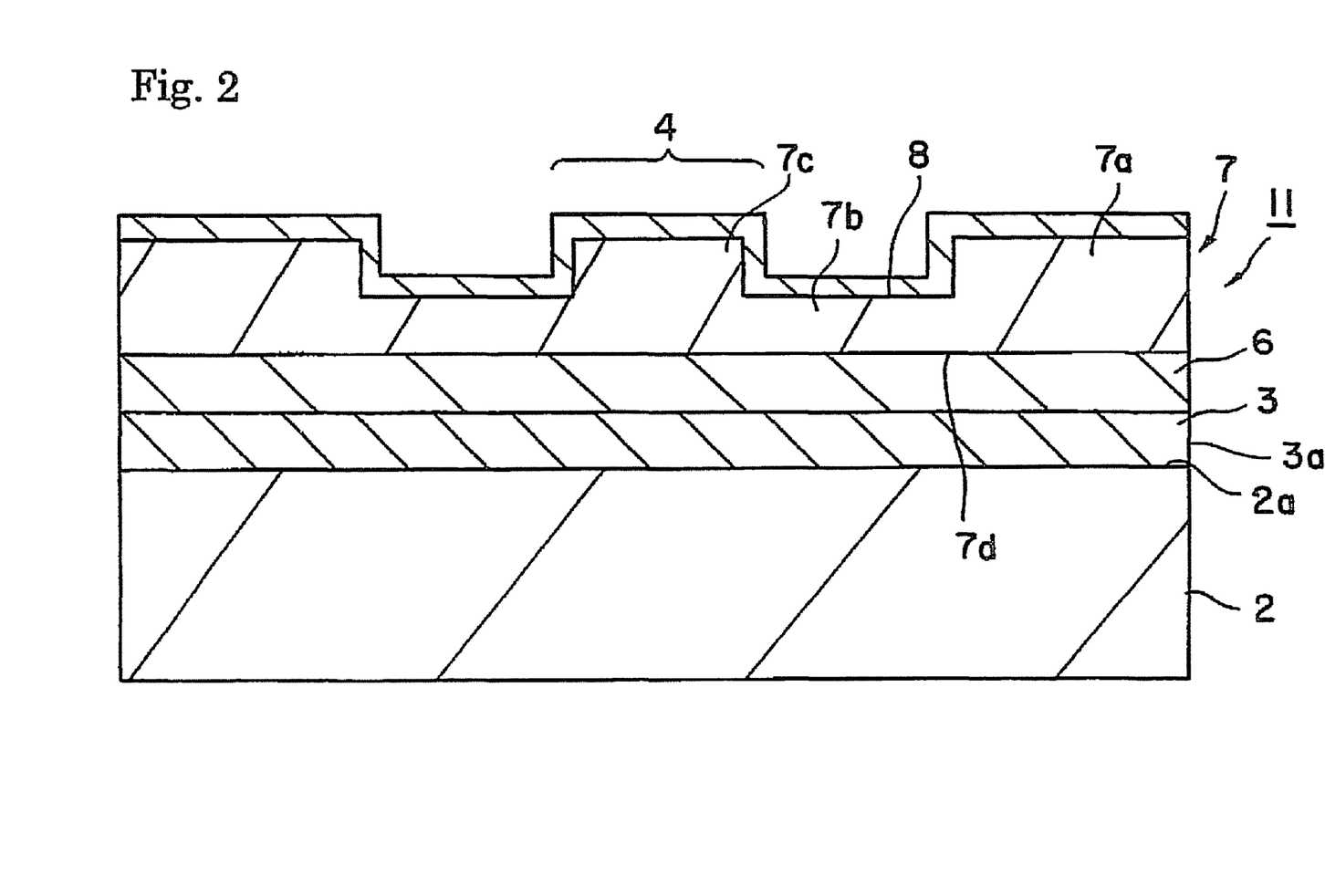
FIG. 2 is a sectional view schematically illustrating a wavelength conversion device 11 relating to a comparison example.

FIG. 1 is a sectional view schematically illustrating a wavelength conversion device 1 relating to one embodiment of the present invention, and FIG. 2 is a sectional view schematically illustrating a wavelength conversion device 11 relating to the comparison example.

A wavelength conversion element 17 includes a wavelength conversion area 4 including a ridge optical waveguide 17c, groove areas 17b provided on both sides of the wavelength conversion area 4, and extended portions 17a provided on the outside of the groove areas 17b. The groove areas 17b are formed thinner than the ridge optical waveguide 17c and the extended portions 17a, and grooves 8 are formed on the surface side of the groove areas 17b. On the surface side of the wavelength conversion element 17 is formed a surface side buffer layer 23. A backside 17e of the wavelength conversion element 17 is flat over the entire surface thereof. A buffer layer 6A is formed on the back face 17e and sides 17d.

The adhesive side of the supporting substrate 2 is flat over the entire surface thereof, and an adhesive layer 3 is formed thereon. The back face 17e of the wavelength conversion element 17 is bonded to the supporting substrate 2 with intervention of the buffer layer 6A and the adhesive layer 3.

Separate portions 18, 19 are provided on both sides of the wavelength conversion element 17, respectively, and made of a ferroelectric material. A through groove 10A is formed between the separate portion 18 and the wavelength conversion element 17, and a through groove 10B is formed between the separate portion 19 and the wavelength conversion element 17. Thereby, the separate portions 18, 19 are made separate as different members from the wavelength conversion element 17, and the ferroelectric material is made discontinuous. A buffer layer 6B is formed on the back face and the side of the separate portion 18, and the upper side buffer layer 23 is formed on the separate portion 18. A buffer layer 6C is formed on the back face and the side of the separate portion 19, and the upper side buffer layer 23 is formed on the separate portion 19. The upper faces of the separate portions 18, 19 and the wavelength conversion element 17 are coated with the buffer layer 23. And the adhesive layer 3 is not exposed from the grooves 10A, 10B because the surfaces of the grooves 10A, 10B are coated with the buffer layer 23. The separate portions 18, 19 are bonded to the supporting substrate 2 with intervention of the adhesive layer 3 and the buffer layers 6B, 6C.

FIG. 2 illustrates the wavelength conversion element 11 of the comparison example. A ferroelectric substrate 7 includes the wavelength conversion portion 4 including a ridge optical waveguide 7c, groove areas 7b provided on both sides of the wavelength conversion portion 4, and extended portions 7a provided on the outside of the groove areas 7b. The groove areas 7b are formed thinner than the ridge optical waveguide 7c and the extended portions 7a, and grooves 8 are formed on the surface side of the groove areas 7b. A back face 7d of the ferroelectric substrate 7 is virtually flat, and a buffer layer 6 is formed on the back face 7d. The adhesive layer 3 is formed on a surface 2a of the supporting substrate 2. The back face 7d of the ferroelectric substrate 7 is bonded to the supporting substrate 2 with intervention of the buffer layer 6 and the adhesive layer 3.

In the conventional device of the comparison example illustrated in FIG. 2, it is conceivable that a stress is likely to be generated starting from an end face 3a exposed from the outer side of the adhesive layer 3 due to the variations of the ambient temperature, and this stress is likely to act on the wavelength conversion portion 4. Because the end face 3a of the adhesive layer is exposed to the outside, the stress is likely to concentrate, which also likely generates partial detachments.

In the element 1 of the present invention illustrated in FIG. 1, the wavelength conversion element 17 is made as a separate body from the separate portions 18, 19. If a stress is generated by the variations of the ambient temperature to the adhesive layer 3 from the side of the wavelength conversion element, the stress is conceivably absorbed in the gaps or the through grooves 10A, 10B between the separate areas 18, 19 and the wavelength conversion element 17. Thereby, it is conceivable that the stress generated on the end face 3a of the adhesive layer 3 is shielded to avoid a direct influence on the wavelength conversion element.

The wavelength conversion means in the wavelength conversion element is not especially confined. In the preferred embodiment, a periodic polarization inversion configuration is formed in the wavelength conversion element, and thereby the wavelength of the fundamental light is converted to output higher harmonics. The period of the periodic polarization inversion configuration is varied in accordance with the wavelength. Although the method of forming the periodic polarization inversion configuration is not especially confined, the electric field poling method is preferred.

Or, it is possible to convert the wavelength of the incident fundamental light into higher harmonics by using non-linear optical crystals such as a lithium potassium niobate, a lithium potassium tantalate, and a lithium potassium niobate-lithium potassium tantalate solid solution.

The ferroelectric material of the wavelength conversion element and that of the separate portions are preferably the same material; however they may be different. These ferroelectric materials are not especially confined, as long as they are capable of modulating light; and a lithium niobate, lithium tantalate, lithium niobate-lithium tantalate solid solution, lithium potassium niobate, KTP, GaAs and quartz can be listed as an example.

In order to further enhance the optical damage resistance of the optical waveguide, one or more metallic elements that are selected from a group of magnesium (Mg), zinc (Zn), scandium (Sc) and indium (In) can be contained into the ferroelectric single crystal, and magnesium is especially preferable.

A rare earth element can be contained as a dopant into the ferroelectric single crystal. The rare earth element functions as an additive element for laser oscillation. As the rare earth element, Nd, Er, Tm, Ho, Dy and Pr are especially preferable.

As the materials for the upper side buffer layer and the backside buffer layer, metal oxides are preferable; and silicon oxide, magnesium fluoride, silicon nitride, aluminum oxide, and tantalum pentoxide can be listed as an example.

The material of the adhesive layer may be organic adhesive or inorganic adhesive. Although the organic adhesive is not especially confined, epoxy adhesive and acrylic adhesive can be cited. And as the inorganic adhesive can be cited a glass, wherein one or plural components of silicon oxide, lead oxide, aluminum oxide, magnesium oxide, calcium oxide, tantalum pentoxide, titanium oxide, niobium pentoxide, zinc oxide and boron oxide are combined.

The processing method for forming the ridge optical waveguide on the ferroelectric layer is not confined, and machining, ion milling, dry etching and laser abrasion can be applied.

The material of the supporting substrate 2 is not especially confined. In the preferred embodiment, the minimum thermal expansion coefficient of the supporting substrate 2 is not smaller than $\frac{1}{5}$ times of the minimum thermal expansion coefficient of the wavelength conversion element 17, and the maximum thermal expansion coefficient of the supporting substrate 2 is not larger than 5 times of the maximum thermal expansion coefficient of the wavelength conversion element 17.

Now, in the case that the electro-optic materials constituting the wavelength conversion element 17 and the supporting substrate 2 respectively do not have the anisotropy of the thermal expansion coefficient, the minimum and the maximum thermal expansion coefficients of the wavelength conversion element 17 and the supporting substrate 2 are equal. In the case that the electro-optic materials constituting the wavelength conversion element 17 and the supporting substrate 2 have the anisotropy of the thermal expansion coefficients, there can be a case that the thermal expansion coefficient varies at each axis. In the case that each electro-optic material constituting the wavelength conversion element 17 is lithium niobate, for example, the thermal expansion coefficient in the X-axis direction and Y-axis direction is $16 \times 10^{-6}/°$ C., which is the maximum. The thermal expansion coefficient in the Z-axis direction is $5 \times 10^{-6}/°$ C., which is the minimum. Therefore, the minimum thermal expansion coefficient of the supporting substrate 2 is set not smaller than $1 \times 10^{-6}/°$ C.; and the maximum thermal expansion coefficient of the supporting substrate 2 is set not bigger than $80 \times 10^{-6}/°$ C. Here, the thermal expansion coefficient of the quartz glass, for example, is $0.5 \times 10^{-6}/°$ C., which is less than $1 \times 10^{-6}/°$ C.

Considering from this view, it is further preferable to set the minimum thermal expansion coefficient of the supporting substrate 2 not smaller than ½ times of the minimum thermal expansion coefficient of the wavelength conversion element 17. And it is further preferable to set the maximum thermal expansion coefficient of the supporting substrate 2 not larger than 2 times of the maximum thermal expansion coefficient of the wavelength conversion element 17.

The concrete material of the supporting substrate 2 is not especially confined, as long as the above conditions are met; and lithium niobate, lithium tantalate, a glass such as quartz glass, and silicon can be listed as an example. In view of the thermal expansion difference, it is preferable to use the same material to the wavelength conversion element and the supporting substrate, and lithium niobate single crystal is especially preferable.

The width L of the device of the present invention is not especially confined; in view of the mechanical strength required for material handling, the width is preferably 0.5 mm or more, and is further preferably 0.7 mm or more. The gap W between the separate portion 18 (or 19) and the wavelength conversion element 17 (gap between the ferroelectric materials) is preferably 5 μm or more, and is further preferably 20 μm or more, in view of suppressing the influence of the ambient temperature on the wavelength conversion area 4. The upper limit of the gap W is not defined; however, since a larger W will increase the processing cost, the gap W is preferably 200 μm or less in this view, and is further preferably 100 μm or less.

The manufacturing method of the device of the present invention is not especially confined; however, the following method can be cited as an illustration. The method includes: preparing a substrate of a ferroelectric substance, forming grooves on a principal plane of this substrate, and bonding this substrate to a supporting substrate. Here, the principal plane with the grooves formed thereon is made the adhesive plane. The method next includes: processing by abrading and/or polishing the substrate of the ferroelectric substance from the backside to reduce the thickness of the substrate. Here, this processing is performed so the grooves are made through from the principal plane of the substrate to the back face. By this processing, the ferroelectric substrate is separated into the two separate portions and the wavelength conversion element to produce three separate bodies.

Figure 3:
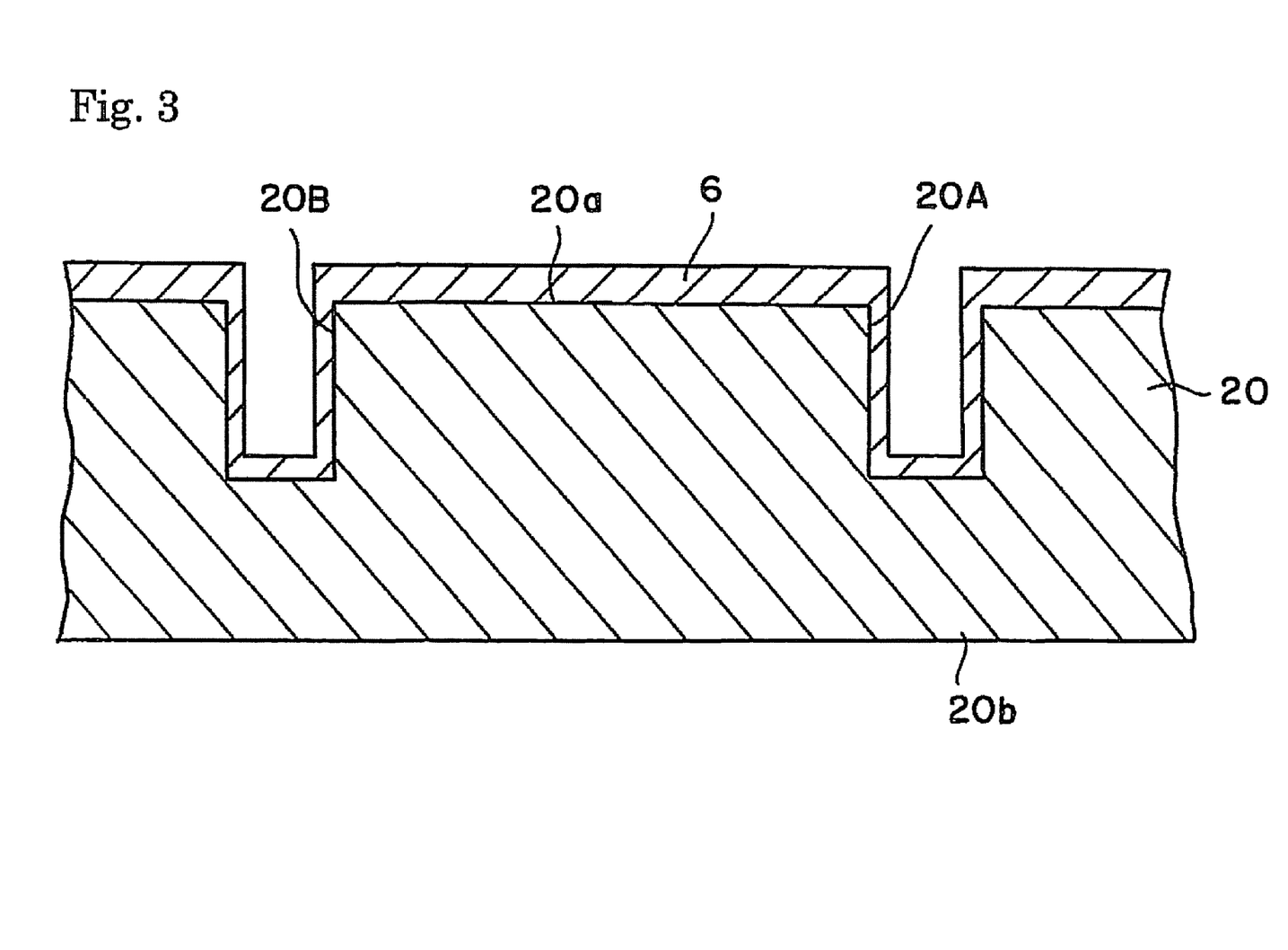
FIG. 3 is a sectional view illustrating a state wherein grooves 20A, 20B are formed on a substrate 20.

FIG. 3 to FIG. 6 are related with this manufacturing method. First, as shown in FIG. 3, a substrate 20 of a ferroelectric material is prepared, and grooves 20A, 20B opening on a principal plane 20a of the substrate 20 are formed. The method of forming the grooves 20A, 20B is not especially confined; and methods such as machining, ion milling, dry etching and laser abrasion can be applied. In a preferred embodiment, the buffer layer 6 is formed on the principal plane 20a of the substrate 20, at this stage.

Figure 4:
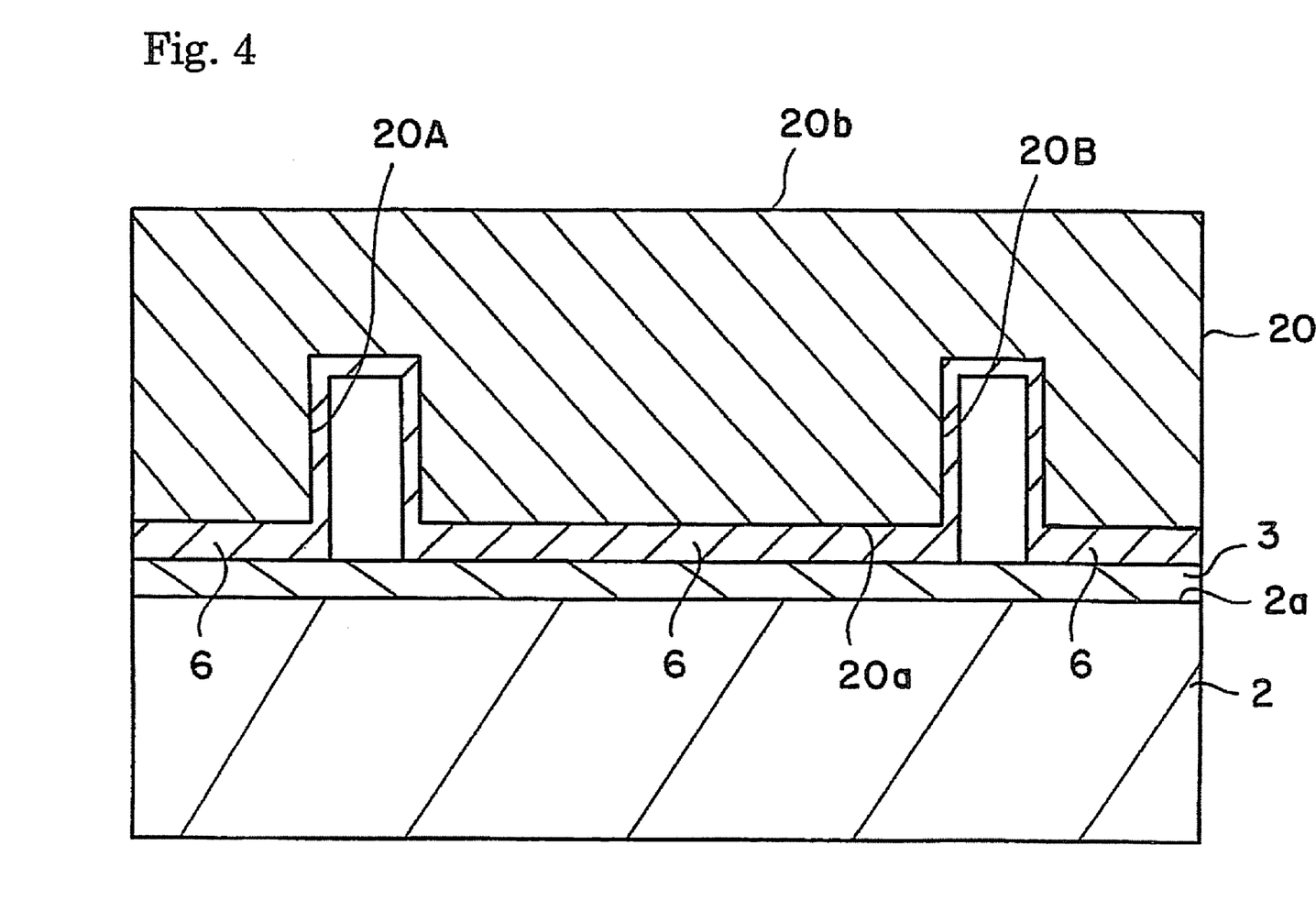
FIG. 4 is a sectional view illustrating a state wherein the substrate 20 in FIG. 3 is bonded to a supporting substrate 2.
Figure 5:
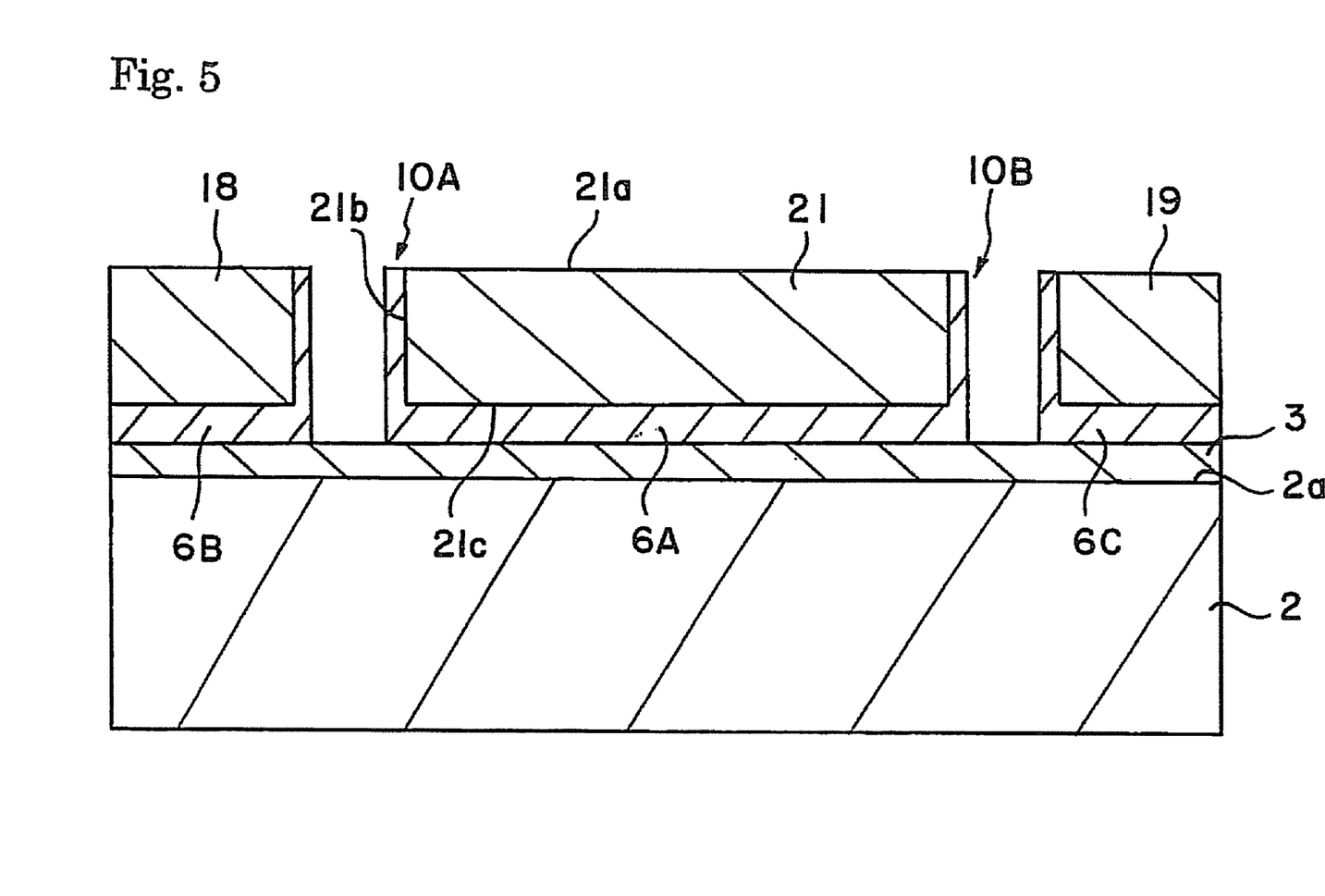
FIG. 5 is a sectional view illustrating a state wherein the substrate 20 in FIG. 4 is processed and through grooves 10A, 10B are formed.

Next, as shown in FIG. 4, the substrate 20 is bonded to the supporting substrate 2 by the adhesive layer 3. Here, the principal plane 20a of the substrate 20 is bonded to the supporting substrate 2. Next, a principal plane 20b on the opposite side of the substrate 20 is processed to reduce the thickness of the substrate 20. Here, as shown in FIG. 5, the grooves 20A, 20B are made through to form the through grooves 10A, 10B. By this processing, the wavelength conversion element is made as a separate body to the separate portions 18, 19.

Figure 6:
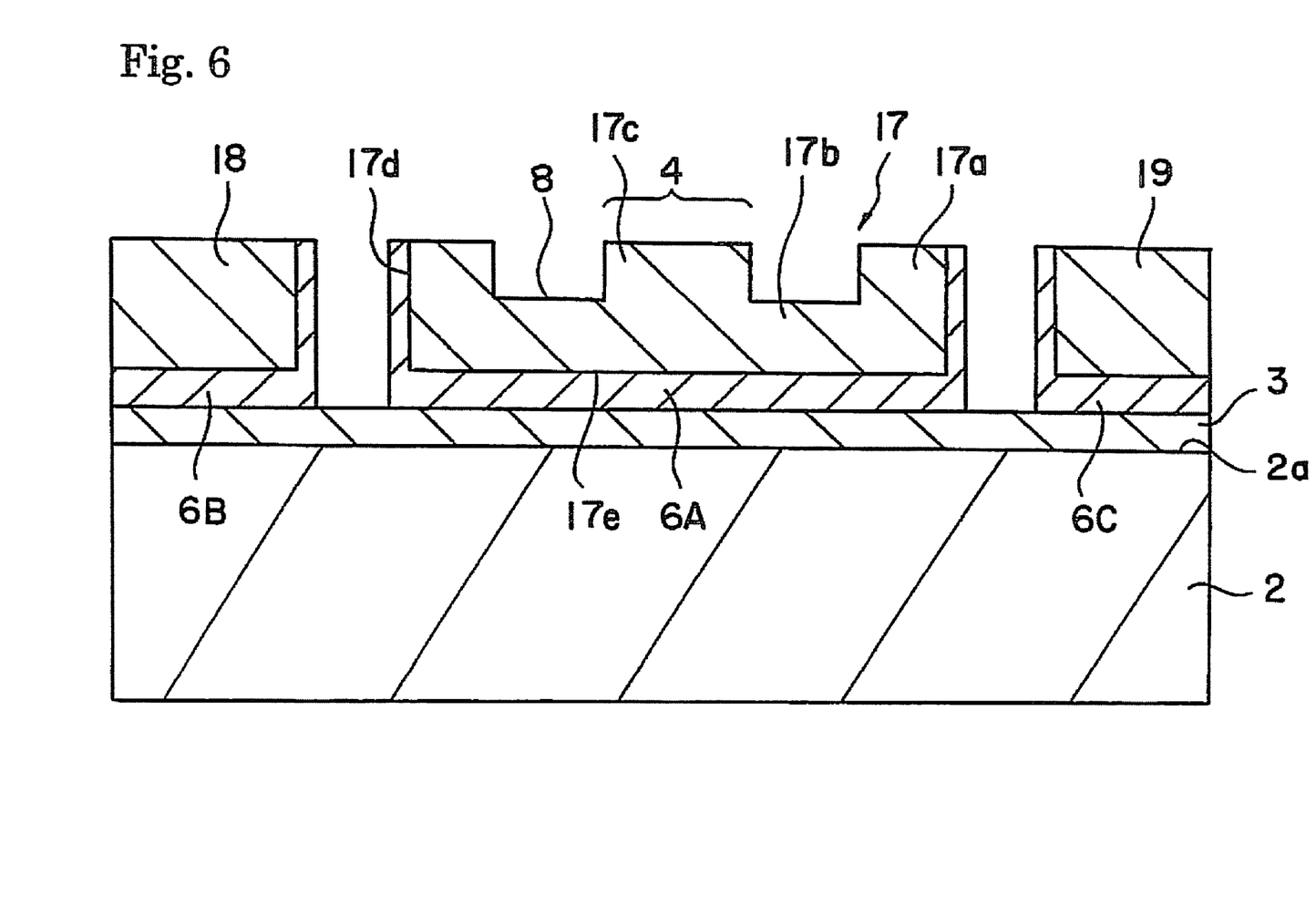
FIG. 6 is a sectional view illustrating a state wherein a ridge area 17c is formed on the substrate in FIG. 5.

Next, a substrate 21 is processed as above from the surface 21a side, and as shown in FIG. 6, the grooves 8 and the ridge optical waveguide 17c are formed. And, the element illustrated in FIG. 1 is obtained by forming the upper buffer layer.

EXAMPLES

The device illustrated in FIG. 1 was made by the method explained with reference to FIG. 3 through FIG. 6.

Concretely, a comb-shaped periodic electrode with a period of 6.56 μm was formed on an MgO 5% doped lithium niobate-5 degree offcut Y substrate 20 of 0.5 mm thick, by photolithography. An electrode membrane was formed over the entire surface of the back face of the substrate; thereafter, a pulse voltage was applied to form a periodic domain polarization inversion. After forming the periodic domain polarization inversion, two grooves 20A, 20B of 20 μm wide and 5 μm deep were formed with 100 um spacing on the surface of the MgO:LN substrate 20, by etching (FIG. 3). After forming the grooves 20A, 20B, a $SiO_2$ under-clad layer 6 of 0.4 um thick was formed by sputtering.

As shown in FIG. 4, the adhesive 3 was applied to the supporting substrate 2 made of a non-doped lithium niobate of 0.5 mm thick, to which was stuck the above MgO doped lithium niobate substrate 20 with the grooves. The principal plane 20b of the MgO doped lithium niobate substrate 20 was abraded and polished until the thickness thereof reached 3.7 μm. As the result, the above grooves 20A, 20B were made through to form the through grooves 10A, 10B, as shown in FIG. 5; the separate portions 18, 19 were severed from the wavelength conversion element 17. Next, the ridge waveguide 17c was formed by laser abrasion method (FIG. 6). The width of the ridge area 17c was 4.5 μm, and the depth of the grooves 8 was 2 μm. After forming the ridge, a $Ta_2O_5$ film 23 of 0.5 um thick was formed on the surface of the waveguide by sputtering (FIG. 1). After the device was cut out with a length of 12 mm and a width of 1.4 mm by a dicer, the faces of both ends were polished. Thereafter, an anti-reflection coating was applied to both end faces of the device.

Figure 7:
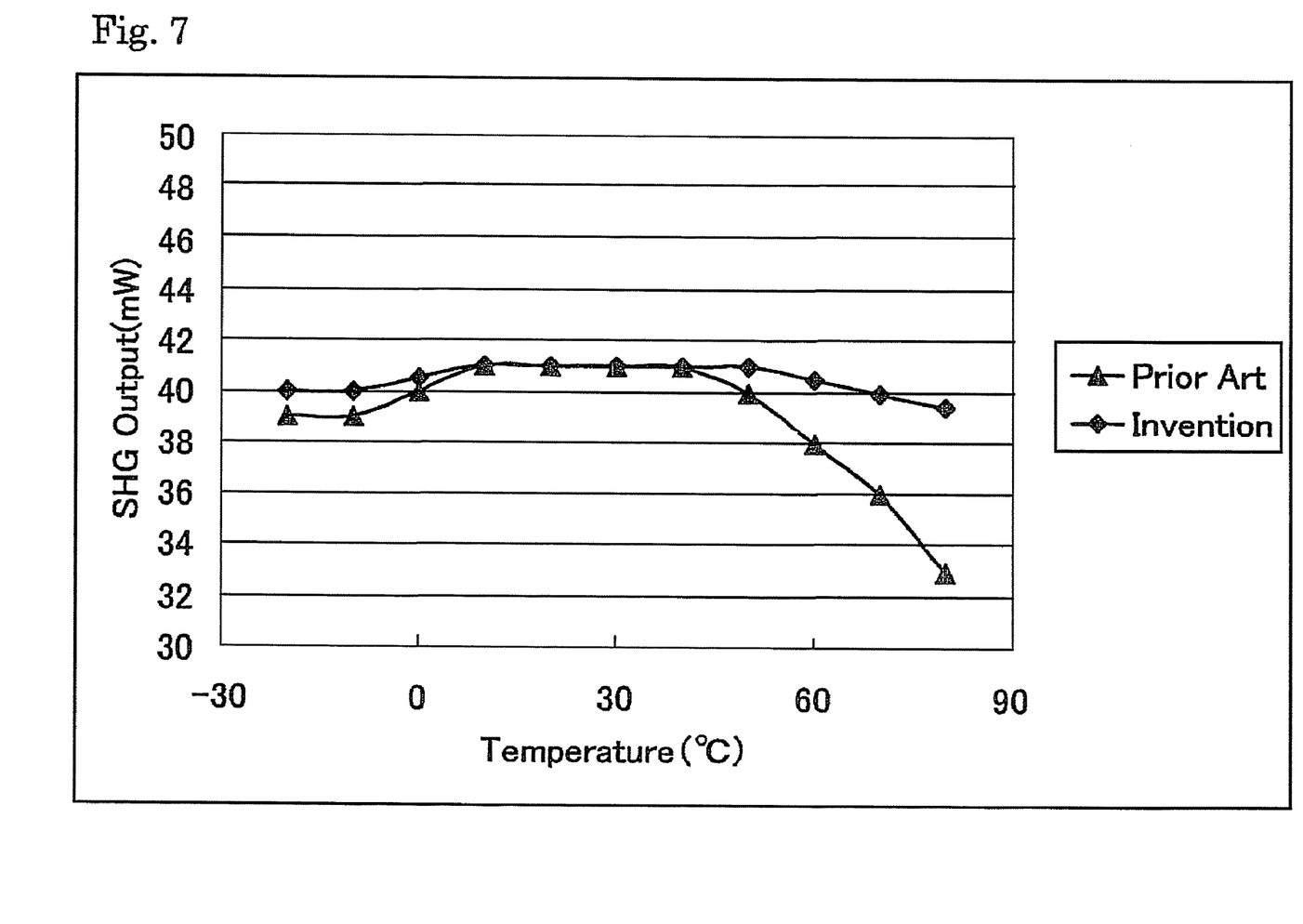
FIG. 7 is a graph illustrating a temperature variation of an SHG output, when the elements of the embodiment and the comparison example are used.

The optical characteristics of this waveguide was measured by using a semiconductor laser. The oscillation power output from the laser was adjusted to 200 mW, and fundamental light was condensed on the end face of the waveguide by a lens; as the result, 140 mW was coupled to the waveguide. The wavelength of the semiconductor laser was varied by adjusting the temperature and was adjusted to a phase-matched wavelength; and as the result, the Secondary-Harmonic-Generation (SHG) output of 41 mW at the maximum was acquired. The wavelength of the fundamental light at that moment was 1060 nm to 1062 nm. And the ambient temperature was varied from −20° C. to +80° C. to measure the output of the second harmonics; as the result, the output variation of the second harmonics was slight, as shown in table 1 and FIG. 7.

Comparison Example

The Secondary-Harmonic-Generation (SHG) device illustrated in FIG. 2 was made in the same manner as the above example. Here, the separate portions 18, 19 and the grooves 10A, 10B were not formed. To the device thus acquired, the ambient temperature was varied from −20° C. to +80° C. to measure the output of the second harmonics as shown in table 1 and FIG. 7. As the result, the output of the second harmonics sharply dropped in the temperature range 60° C. or more.

TABLE 1

| Temperature (° C.) | Comparison Example (mW) | Inventive Example (mW) |
|---|---|---|
| −20 | 39 | 40 |
| −10 | 39 | 40 |
| 0 | 40 | 40.5 |
| 10 | 41 | 41 |
| 20 | 41 | 41 |
| 30 | 41 | 41 |
| 40 | 41 | 41 |
| 50 | 40 | 41 |
| 60 | 38 | 40.5 |
| 70 | 36 | 40 |
| 80 | 33 | 39.5 |

The invention claimed is:

1. A wavelength conversion device comprising:
a supporting substrate having a surface;
a wavelength conversion element provided on said supporting substrate and comprising a ferroelectric material, said wavelength conversion element comprising a ridge optical waveguide, first grooves provided on both sides of said ridge optical waveguide, respectively, and extended portions provided on the outside of said first grooves, respectively;
separate portions provided on both sides of said wavelength conversion element, respectively, and comprising a ferroelectric material, said separate portions are separated from said wavelength conversion element by second grooves respectively; and
an adhesive layer bonding the surface of said supporting substrate and said wavelength conversion element and bonding said supporting substrate and said separate portions;
wherein the surface is flat under the wavelength conversion element, the separate portions and the second grooves,
wherein said wavelength conversion element and said separate portions have upper faces, respectively, said device further comprising an upper side buffer layer formed on said upper faces of said wavelength conversion element and said separate portions, and
wherein the upper side buffer layer contacts a back side buffer layer along a plane perpendicular to the substrate surface on each second groove wall surface.

2. The wavelength conversion device of claim 1, wherein the wavelength conversion element and the separate portions are separately bonded to the supporting substrate by the adhesive layer with a single predetermined gap formed directly between back side buffer layers of said wavelength conversion element and said separate portions. respectively.

3. A wavelength conversion device comprising:
a supporting substrate having a surface;
a wavelength conversion element provided on said supporting substrate and comprising a ferroelectric material, said wavelength conversion element comprising a ridge optical waveguide, first grooves provided on both sides of said ridge optical waveguide, respectively, and extended portions provided on the outside of said first grooves, respectively;
separate portions provided on both sides of said wavelength conversion element, respectively, and comprising g a ferroelectric material, said separate portions are separated from said wavelength conversion element by second grooves respectively; and
an adhesive layer bonding the surface of said supporting substrate and said wavelength conversion element and bonding said supporting substrate and said separate portions;
wherein the surface is flat under the wavelength conversion element, the separate portions and the second grooves,
wherein said wavelength conversion element and said separate portions have back faces, respectively, said device further comprising a buffer layer formed on said back faces of said wavelength conversion element and said separate portions, and
wherein the back side buffer layer of the wavelength conversion element and the back side buffer layer of the separate portions extend up each second groove side wall of said wavelength conversion device.

4. The wavelength conversion device of claim 3, wherein said wavelength conversion element and said separate portions have upper faces, respectively, said device further comprising an upper side buffer layer formed on said upper faces of said wavelength conversion element and said separate portions.

* * * * *